(12) United States Patent
Bossard et al.

(10) Patent No.: US 8,889,098 B1
(45) Date of Patent: Nov. 18, 2014

(54) INTEGRATED MICRO-CHANNEL REFORMER AND PURIFIER FOR EXTRACTING ULTRA-PURE HYDROGEN GAS FROM A HYDROCARBON FUEL

(76) Inventors: Peter R. Bossard, Ivyland, PA (US); Jacob Mettes, Boulder, CO (US)

( * ) Notice: Subject to any disclaimer, the term of this patent is extended or adjusted under 35 U.S.C. 154(b) by 279 days.

(21) Appl. No.: 13/399,168

(22) Filed: Feb. 17, 2012

(51) Int. Cl.
*C01B 3/24* (2006.01)
*H01M 8/04* (2006.01)

(52) U.S. Cl.
USPC ............ 423/650; 423/651; 423/652; 429/425

(58) Field of Classification Search
USPC ............................ 423/650–654; 429/423–425
See application file for complete search history.

(56) References Cited

U.S. PATENT DOCUMENTS

| | | | |
|---|---|---|---|
| 3,375,140 A * | 3/1968 | Oswin ........................... | 429/411 |
| 3,450,500 A * | 6/1969 | Setzer et al. .................. | 423/653 |
| 6,207,132 B1 * | 3/2001 | Lin et al. ..................... | 423/648.1 |
| 6,821,501 B2 * | 11/2004 | Matzakos et al. ............. | 423/652 |
| 6,919,062 B1 * | 7/2005 | Vasileiadis et al. ......... | 423/437.1 |
| 7,704,485 B1 | 4/2010 | Bossard et al. | |
| 8,771,637 B2 * | 7/2014 | Wynn et al. ................... | 423/650 |
| 8,784,531 B2 * | 7/2014 | Okada et al. ...................... | 95/45 |
| 2003/0159354 A1 * | 8/2003 | Edlund et al. ................ | 48/127.9 |
| 2003/0172589 A1 * | 9/2003 | Krueger ....................... | 48/127.9 |
| 2004/0142220 A1 * | 7/2004 | Brenner et al. ................. | 429/19 |
| 2008/0305034 A1 * | 12/2008 | Edlund et al. ................. | 423/652 |
| 2011/0171118 A1 * | 7/2011 | Hofmann et al. ............. | 423/652 |

* cited by examiner

*Primary Examiner* — Wayne Langel
(74) *Attorney, Agent, or Firm* — LaMorte & Associates, P.C.

(57) ABSTRACT

A system and method of producing hydrogen from a mixture of hydrocarbon fuel and steam. Reaction cells are provided that each contains a first tube of hydrogen permeable material and a second tube of hydrogen impermeable material that are concentrically positioned. This creates a gap space between the first tube and the second tube. The gap space is heated by burning a combustion gas outside of the two concentric tubes. A water gas shift reaction occurs in the gap space. Hydrogen is created that permeates through the first tube and becomes separated from the remainder of the reaction gases. The hydrogen gas is collected for use. As such, the system and method acts both as a gas shift reactor and as a hydrogen separator even though it is a single unit.

18 Claims, 3 Drawing Sheets

US 8,889,098 B1

INTEGRATED MICRO-CHANNEL REFORMER AND PURIFIER FOR EXTRACTING ULTRA-PURE HYDROGEN GAS FROM A HYDROCARBON FUEL

BACKGROUND OF THE INVENTION

1. Field of the Invention

In general, the present invention relates to systems and methods that are used to steam reform hydrocarbons to generate a volume of hydrogen rich gases and then separate the hydrogen from such gases for separate use. More particularly, the present invention relates to the structure of reaction chambers where gas shift reactions are produced and where hydrogen permeable membranes are used to separate hydrogen gas.

2. Prior Art Description

In industry, there are many applications for the use of ultra pure hydrogen. For instance, there are many PEM fuel cells that operate using hydrogen. The hydrogen, however, must be ultra pure. In the art, ultra pure hydrogen is commonly considered to be hydrogen having purity levels of at least 99.999%. Any molecules of carbon dioxide, carbon monoxide or other contaminant gases that are received by the fuel cell either reduces its efficiency or causes damage to the fuel cell.

Hydrogen gas does not exist naturally on earth to any significant extent because it reacts with many elements and readily combines to form compounds.

Hydrogen gas must therefore be manufactured. Hydrogen gas can be manufactured in a number of ways. For instance, hydrogen gas can be created by splitting water molecules through electrolysis. However, the power needed for electrolysis is always significantly greater than the power available from a fuel cell that utilizes the output hydrogen gas from the electrolysis. Any fuel cell system that obtains hydrogen gas from electrolysis, therefore, results in a net power loss.

Techniques have been developed where hydrogen gas can be extracted from a hydrocarbon fuel and water mixture that has undergone an endothermic reaction. This initial endothermic reaction occurs between 350° C. and 1000° C. depending mostly on the initial hydrocarbon fuel being used. In the steam reforming process the hydrocarbon fuel and water are converted in an endothermic reaction principally into hydrogen ($H_2$), carbon monoxide (CO), methane ($CH_4$), carbon dioxide ($CO_2$) and water ($H_2O$). The amount of energy required depends on the type of fuel being reformed. In steam reforming, a principal challenge is efficiently supplying the endothermic energy as the cracking of the fuel and steam proceeds.

The useful chemical energy in the resultant gases is contained in the $H_2$, CO, $CO_2$ and $CH_4$. The chemical energy in these three resultant gases contains the chemical energy that was originally in the hydrocarbon fuel, plus some of the endothermic energy that was used to heat the reaction.

The resultant gases of $H_2$, $CH_4$, CO and $CO_2$ are mixed with steam at an elevated temperature of between 300° C. and 450° C. typically. In this temperature range, a water gas shift reaction is induced. Once the water gas shift reaction is induced, the CO present in the resultant gases reacts with the water ($H_2O$). The CO and the $H_2O$ react as follows:

$$CO + H_2O \rightarrow CO_2 + H_2$$

It can therefore be seen that additional hydrogen gas is created by the water gas shift reaction. The hydrogen gas is then purified by drawing the hydrogen gas through a hydrogen permeable membrane in a hydrogen separator. The purified hydrogen can then be used to power a fuel cell or serve some other industrial purpose.

Systems that utilize a water gas shift reaction in such a manner are exemplified by U.S. Pat. No. 7,704,485, entitled System And Method For Processing Fuel For Use By A Fuel Cell Using A Micro-Channel Catalytic Hydrogen Separator.

In the prior art, the obtaining of purified hydrogen from a hydrocarbon is a two-step process. In the first step, the hydrocarbon is reacted with water in a reaction chamber to create reaction gases. In a second step, the reaction gases are introduced into a hydrogen separator in order to separate out the purified hydrogen. In production, the two most important and expensive components in generating hydrogen are the reactor and the separator. Although these components are separate in the prior art, it has been learned that significant cost savings and efficiencies can be obtained by integrating the reaction chamber and the hydrogen separator into a single integrated component.

A need therefore exists for a design of an integrated component that can efficiently produce a water gas shift reaction in a hydrocarbon fuel and then separate out the hydrogen from the reaction gases. This need is met by the present invention as described and claimed below.

SUMMARY OF THE INVENTION

The present invention is a system and method of producing hydrogen from a mixture of hydrocarbon fuel and steam. The system and method utilize a reaction cell that contains a first tube of hydrogen permeable material and a second tube of hydrogen impermeable material that are concentrically positioned so that a gap space exists between the first tube and the second tube.

The gap space is heated by burning a combustion gas outside of the two concentric tubes. A mixture of the hydrocarbon fuel and steam are introduced into the gap space. In the heated gap space, the mixture undergoes a water gas shift reaction to create reaction gases, wherein hydrogen gas is included as part of the reaction gases.

At least some of said hydrogen gas permeates through the first tube and becomes separated from the remainder of the reaction gases. The hydrogen gas is collected for use. As such, the system and method acts both as a gas shift reactor and as a hydrogen separator even though it is a single unit.

The combustion gas used to heat the gap space is drawn either from the collected hydrogen gas or from the reaction gases.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention is a hydrogen processor that performs both as a steam reformer and as a purifier. The hydrogen processor reacts a hydrocarbon with steam to produce raffinate gases and then acts to separate hydrogen from those raffinate gases. Although the hydrogen processor can be used to generate ultrapure hydrogen for a variety of industrial applications, the present invention hydrogen processor is particularly well suited for use in generating hydrogen gas on demand for a proton exchange membrane (PEM) fuel cell. Accordingly, the exemplary embodiments of the hydrogen processors show their use with a PEM fuel cell to set forth the best modes contemplated for the design. However, it should be understood that the hydrogen processor can be used to generate ultra-pure hydrogen for other purposes.

Figure 1:
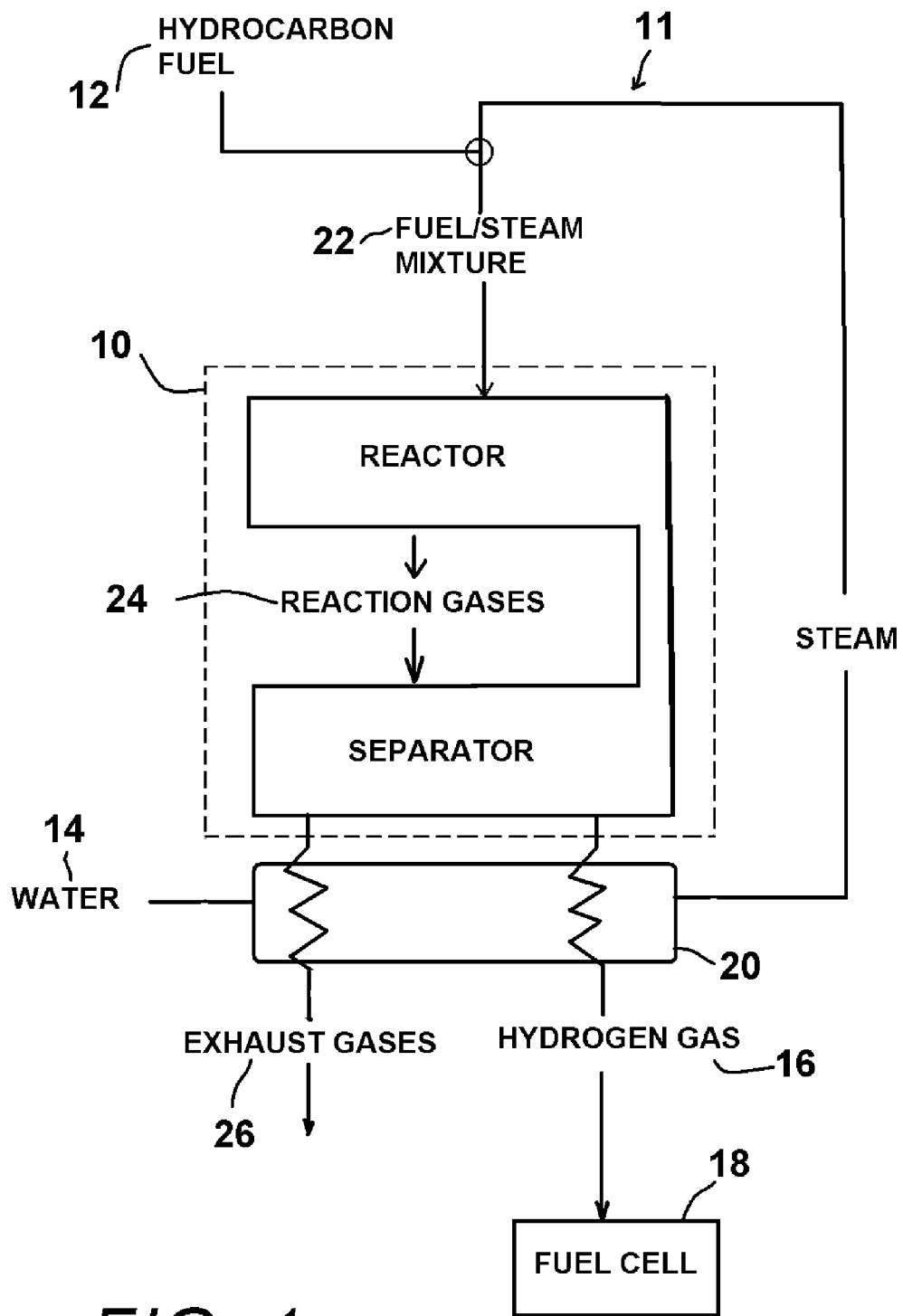
FIG. 1 is a schematic of an exemplary embodiment of a fuel cell system powered by the present invention hydrogen processor.

Referring to FIG. 1, there is shown a schematic of a system 11 that utilizes the hydrogen processor 10. The hydrogen processor 10 reacts a hydrocarbon fuel 12 and water 14 for the purpose of ultimately producing purified hydrogen gas 16 in a highly efficient manner. The hydrogen gas 16 produced is ultra-pure and is used for a secondary purpose, such as powering a PEM fuel cell 18. The hydrogen gas 16 can also be compressed locally to high pressure as would occur in a hydrogen fill station and then dispensed into a vehicle which contains a means for converting the energy in the stored hydrogen to useful work including motion.

The inputs to the hydrogen processor 10 are water 14 and a hydrocarbon fuel 12. The water 14 is converted to superheated steam by a heat exchanger 20. The hydrocarbon fuel 12 is mixed with the superheated steam. Upon mixing, the hydrocarbon fuel 12 is completely vaporized and begins to react with the steam. The fuel/steam mixture 22 is fed into the hydrogen processor 10. Within the hydrogen processor 10, the conditions for the water gas shift reaction are maximized, as will later be explained in detail. The hydrogen processor 10 first produces reaction gases 24 that primarily include hydrogen ($H_2$), carbon dioxide ($CO_2$) and steam ($H_2O$). However, smaller concentrations of carbon monoxide (CO) and methane ($CH_4$) are also present. Furthermore, depending upon the type of hydrocarbon fuel 12 being used, trace amounts of hydrogen sulfate ($H_2S$) may also be present.

As will later be explained, the hydrogen processor 10 is actively heated by the partial combustion of some of the reaction gases 24 in order to provide the energy needed to maintain the endothermic reaction. This produces exhaust gases 26. Heat from the exhaust gases 26 is transferred to the heat exchanger 20 to help heat the incoming water 14.

The reaction gases 24 produced within the hydrogen processor 10 are exposed to a hydrogen permeable membrane. The hydrogen permeable membrane enables hydrogen gas 16 to be separated from the reaction gases 24.

As has been stated, the reformation process within the hydrogen processor 10 produces reaction gases 24 that contain hydrogen ($H_2$) as well as secondary reaction gages. Some of the reaction gases 24 are burned to maintain the operational temperature of the hydrogen processor 10, which is between 550 degrees Celsius and 800 degrees Celsius. This produces hot exhaust gases 26. Both the purified hydrogen gas 16 and the exhaust gases 26 exiting the hydrogen processor 10 pass through the heat exchanger 20. As such, excess heat is recovered to provide the heat exchanger 20 with enough energy to convert incoming water 14 into superheated steam.

The flow rate through the hydrogen processor 10 is controlled so that the reaction gases 24 contain just enough hydrogen gas and methane to burn.

Figure 2:
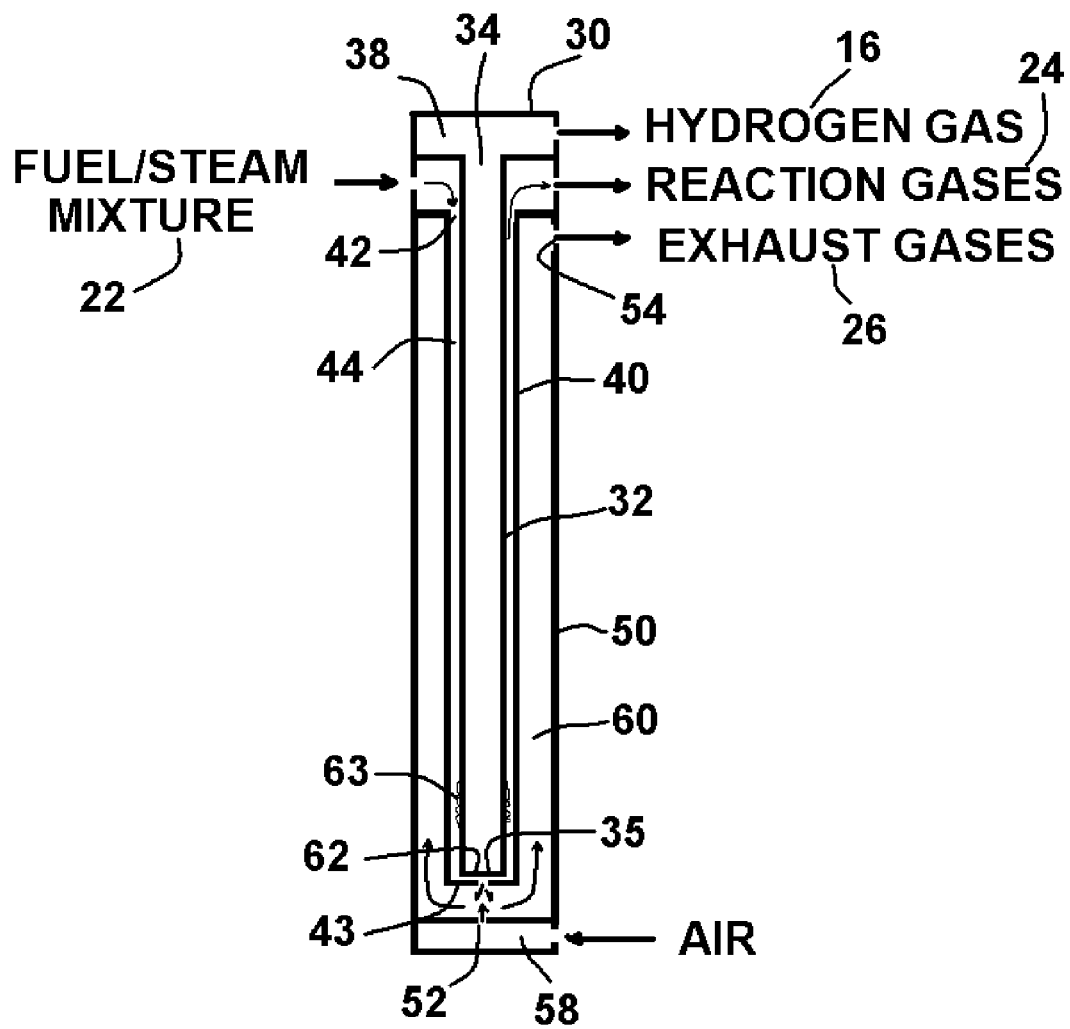
FIG. 2 is a cross-sectional view of a first exemplary embodiment of a hydrogen processor that can be used within the system of FIG. 1.

Within the hydrogen processor 10 are a plurality of reaction cells. Referring to FIG. 2 in conjunction with FIG. 1, a first exemplary embodiment of a single reaction cell 30 is shown. It will be understood that the hydrogen processor 10 may contain dozens or hundreds of such reaction cells 30. However, since all the reaction cells 30 function in the same manner, a single reaction cell 30 is shown for the purpose of simplicity and clarity.

Each reaction cell 30 contains concentric tube structures. In the center of each reaction cell 30 is a hydrogen permeable tube 32. The hydrogen permeable tube 32 is a tube made of a hydrogen permeable alloy. The hydrogen permeable tube 32 has an open first end 34 and a closed second end 35. The open first end 34 communicates with a hydrogen collection manifold 38.

A supply tube 40 surrounds the hydrogen permeable tube 32. The supply tube 40 supplies a flow of the fuel/steam mixture 22. The supply tube 40 has an open top end 42 into which the hydrogen permeable tube 32 extends. This creates a very narrow reaction gap 44 between the interior of the supply tube 40 and the exterior of the hydrogen permeable tube 32. The reaction gap 44 is very small, preferably being no larger than 5000 microns. The best size for the reaction gap 44 is between 100 microns and 1000 microns. In such a confined space, the water molecules and the fuel molecules within the fuel/steam mixture 22 are forced to interact, thereby inducing the water gas shift reaction to occur within the reaction gap 44.

The supply tube 40 receives the supply of the fuel/steam mixture 22 that enters the hydrogen processor 10 and directs those input gases into the reaction gap 44. As a result, the fuel/steam mixture 22 enters the open top end 42 of the supply tube 40 and is forced to flow around the hydrogen permeable tube 32 as the water gas shift reaction occurs. Heat is added to the fuel/steam mixture 22 while in the reaction gap 44, therein inducing the water gas shift reaction to begin and run to exhaustion. By spreading the fuel/steam mixture 22 very thinly throughout the available reaction gap 44, a highly efficient water gas shift reaction can be created, wherein most of the incoming fuel/steam mixture 22 is converted to less complex molecules.

To ensure a highly efficient water gas shift reaction, heat must be quickly added to the fuel/steam mixture 22 while it flows through the narrow reaction gap 44. To ensure an adequate heat flow, a confinement tube 50 is positioned around the supply tube 40. The supply tube 40 descends into the confinement tube 50. The confinement tube 50 has an opening 52 at its bottom and an opening 54 at its top. The opening 54 at the top leads to the exhaust output manifold of the hydrogen processor 10. The opening 52 at the bottom 52 is exposed to a controlled supply of air from an air manifold 58.

The confinement tube 50 creates a combustion gap 60 around the exterior of the supply tube 40. This combustion gap 60 receives air from the air manifold 58. A small precision opening 62 is formed in the bottom end 43 of the supply tube 40. This small opening 62 is engineered to enable a small predetermined percentage of the reaction gases 24 from within the reaction gap 44 to flow into the combustion gap 60 at the operating temperature and pressure of the hydrogen processor 10. The pressure within the reaction gap 44 is always maintained higher than the pressure within the combustion gap 60. In this manner, no air is permitted to back flow into the reaction gap 44 from the combustion gap 60.

When some of the reaction gases 24 flow into the combustion gap 60, they react with the air and combust. The combustion heats the outside of the supply tube 40 and provides the heat needed to heat the water gas shift reaction occurring in the reaction gap 44 inside the supply tube 40. Catalyst material 63 can be disposed on the exterior of the supply tube 40 to promote full combustion.

It will be understood that as the fuel/steam mixture 22 enters the supply tube 40. The fuel/steam mixture 22 is forced to flow down through the reaction gap 44 where it is thinned and heated. The fuel/steam mixture 22 is forced to pass through the ultra-small reaction gap 44 between the interior of the supply tube 40 and the exterior of the hydrogen permeable tube 32. The fuel/steam mixture 22 undergoes a water gas shift reaction to produce the reaction gases 24. Hydrogen gas 16 is contained within the reaction gases 24. The hydrogen gas 16 permeates through the hydrogen permeable tube 32 and is collected for use. Some of the reaction gases 24 are also leaked to the outside of the supply tube 40 and are burned. This provides the heat required to run the water gas shift reaction. The combustion also creates exhaust gases 26.

The exhaust gases 26 that exit are very hot and are directed into the heat exchanger 20, as has previously been indicated. The result is that the hydrogen processor 10, using a single cell structure, both reacts hydrocarbons with water and separates hydrogen gas from the resultant gases. The two step/two unit process used in the prior art is now a single step/single unit process.

Figure 3:
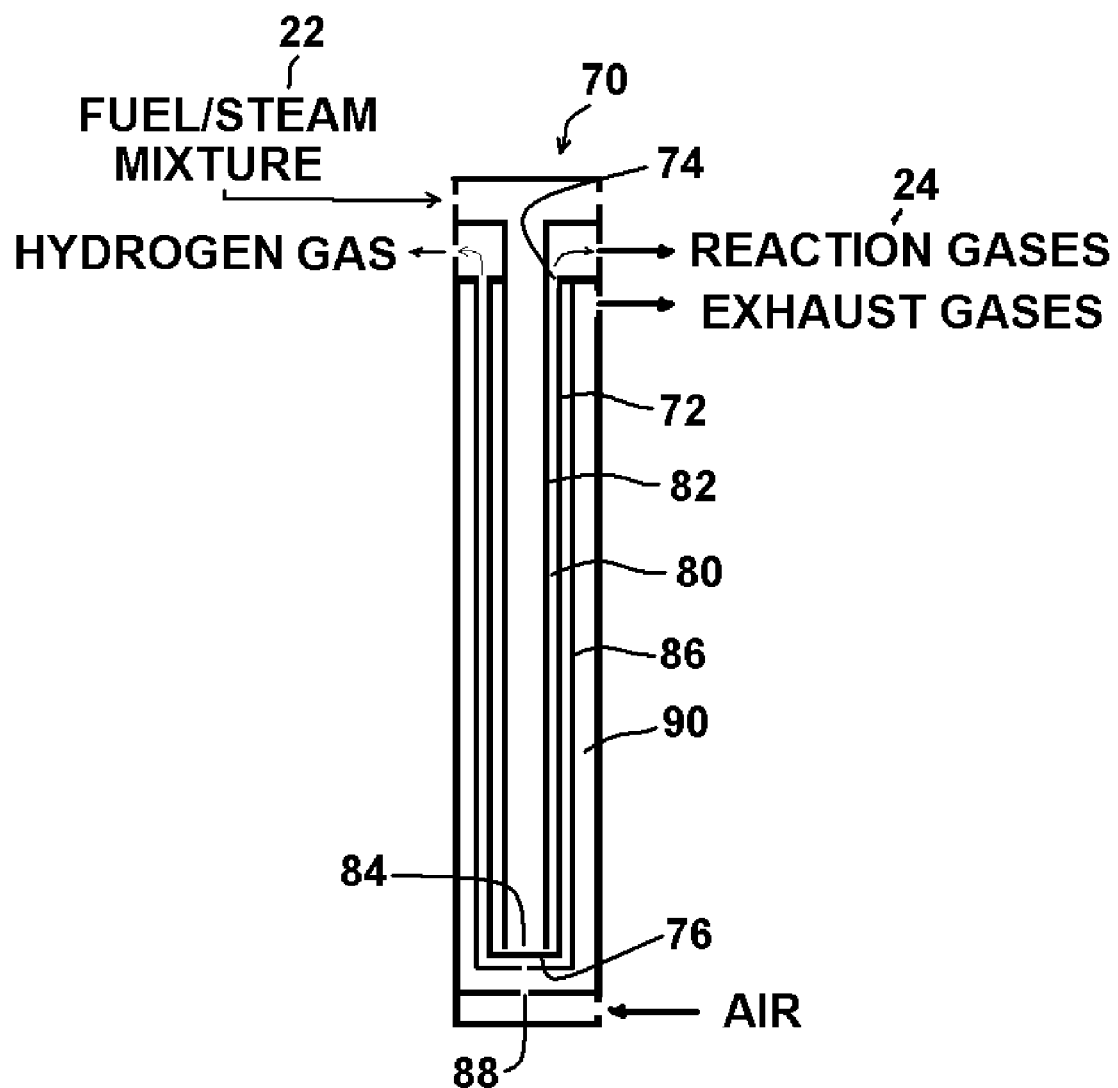
FIG. 3 is a cross-sectional view of a second exemplary embodiment of a hydrogen processor that can be used within the system of FIG. 1.

Referring to FIG. 3, a second exemplary embodiment of a reaction cell 70 is shown. In this embodiment, a hydrogen permeable tube 72 is supplied having an open top 74 and a closed bottom 76. A supply tube 80 is positioned inside the hydrogen permeable tube 72. This creates a reaction gap 82 between the exterior of the supply tube 80 and the interior of the hydrogen permeable tube 72. The fuel/steam mixture 22 is introduced into the supply tube 80. The fuel/steam mixture 22 flows out of the open bottom end 84 of the supply tube 80 and into the reaction gap 82 between the supply tube 80 and the hydrogen permeable tube 72. Both while in the supply tube 80 and while in the reaction gap 82, the fuel/steam mixture 22 is heated and induced into a water gas shift reaction that produced reaction gases 24. The reaction gases 24 pass through the narrow reaction gap 82, wherein most free hydrogen permeates through the hydrogen permeable tube 72 and is collected.

A collection tube 86 surrounds the hydrogen permeable tube 72. The collection tube 86 collects all the hydrogen that permeates through the hydrogen permeable tube 72. A small opening 88 is engineered in the collection tube 86. The small opening 88 enables a small amount of the collected hydrogen to leak out into a combustion chamber 90. In the combustion chamber 90, the hydrogen mixes with air and combusts. This heats the collection tube 86, the hydrogen permeable tube 72 and the supply tube 80. The combustion provides the heat needed to run the water gas shift reaction.

In both embodiments of the present invention that have been illustrated and described, it will be understood that a fuel/water mixture is caused to undergo a water gas shift reaction in the space between two concentric tubes that are present in a combustion chamber. One of the concentric tubes is made from a hydrogen permeable alloy and permits hydrogen gas to pass through its structure for collection. In both embodiments, it will be understood that catalysts can be added into the spaces between or outside the tubes to promote the water gas shift reaction and/or to promote combustion, as needs may be.

Furthermore, it will be also understood that the embodiments of the hydrogen processor are merely exemplary and that a person skilled in the art can make many changes using functionally equivalent configurations. For instance, in both embodiments of the reaction cell, combustion occurs under the reaction cell. It will be understood that depending upon the orientation of the reaction cell, combustion can be initiated at the side or even at the top of the reaction cell. What is important is that the heat of the combustion evenly heat the reaction cell. All such variations, modifications, and alternate embodiments are intended to be included within the present invention as defined by the claims.

What is claimed is:

1. A method of producing hydrogen from a mixture of hydrocarbon fuel and steam, said method comprising the steps of:
providing a reaction cell that contains a first tube of hydrogen permeable material and a second tube of impermeable material concentrically positioned so that a gap space exists between said first tube and said second tube, wherein said gap space between said first tube and said second tube is between 100 microns and 1000 microns;
heating said gap space;
introducing said mixture of said hydrocarbon fuel and steam into said gap space, wherein said mixture is thinned in said gap space causing said steam and said hydrocarbon fuel to efficiently absorb heat and react in a water gas shift reaction to create reaction gases, wherein hydrogen gas is included within said reaction gases;
wherein at least some of said hydrogen gas permeates through said first tube and becomes separated from a remainder of said reaction gases.

2. The method according to claim 1, wherein said step of heating said gap space includes burning a combustion gas outside of both said first tube and said second tube.

3. The method according to claim 2, wherein said combustion gas is drawn from said reaction gases.

4. The method according to claim 2, wherein said combustion gas is drawn from said hydrogen gas.

5. The method according to claim 2, wherein said first tube that is concentrically positioned within said second tube.

6. The method according to claim 5, wherein said second tube has a bottom end and an opening in said bottom end that enables at least some of said reaction gases to exit said second tube and combust outside of said second tube.

7. The method according to claim 2, wherein said second tube that is concentrically positioned within said first tube.

8. The method according to claim 7, wherein said first tube has a bottom end and an opening in said bottom end that enables at least some of said hydrogen gas to exit said first tube and combust outside of said first tube.

9. The method according to claim 1, wherein said step of providing a reaction cell further includes providing a combustion chamber that surrounds both said first tube and said second tube, wherein a combustion gas exists within said combustion chamber.

10. The method according to claim 9, wherein said combustion chamber is a tube that concentrically surrounds said first tube and said second tube.

11. A method of producing hydrogen from a mixture of hydrocarbon fuel and steam, said method comprising the steps of:
providing a first tube of hydrogen permeable material;
providing a second tube of impermeable material concentrically around said first tube so that a gap space exists between said first tube and said second tube, wherein said gap space between said first tube and said second tube is between 100 microns and 1000 microns;
heating said gap space;
introducing said mixture of said hydrocarbon fuel and steam into said gap space, wherein said mixture is thinned in said gap space causing said steam and said hydrocarbon fuel to efficiently absorb heat and react in a water gas shift reaction to create reaction gases within said gap space, wherein hydrogen gas is included within said reaction gases;

wherein at least some of said hydrogen gas permeates through said first tube and is collected from said first tube for use.

12. The method according to claim 11, wherein said step of heating said gap space includes burning a combustion gas outside of both said first tube and said second tube.

13. The method according to claim 12, wherein said combustion gas is drawn from said reaction gases.

14. The method according to claim 13, wherein said second tube has a bottom end and an opening in said bottom end that enables at least some of said reaction gases to exit said second tube and combust outside of said second tube.

15. A method of producing hydrogen from a mixture of hydrocarbon fuel and steam, said method comprising the steps of:

providing a first tube of hydrogen permeable material;

providing a second tube of impermeable material concentrically inside said first tube so that a gap space exists between said first tube and said second tube, wherein said gap space is less than 1000 microns;

heating said gap space;

introducing said mixture of said hydrocarbon fuel and steam into said gap space, wherein said mixture is thinned in said gap space causing said steam and said hydrocarbon fuel to efficiently absorb heat and react in a water gas shift reaction to create reaction gases within said gap space, wherein hydrogen gas is included within said reaction gases;

wherein at least some of said hydrogen gas permeates through said first tube and is collected from said first tube for use.

16. The method according to claim 15, wherein said step of heating said gap space includes burning a combustion gas outside of both said first tube and said second tube.

17. The method according to claim 16, wherein said combustion gas is drawn from said hydrogen gas in said first tube.

18. The method according to claim 15, wherein said first tube has a bottom end and an opening in said bottom end that enables at least some of said hydrogen gas to exit said first tube and combust outside of said first tube.

* * * * *